United States Patent

[11] 3,583,307

| [72] | Inventor | Maurice W. Lee, Sr. |
| | | Boley, Okla. |
| [21] | Appl. No. | 809,335 |
| [22] | Filed | Mar. 21, 1969 |
| [45] | Patented | June 8, 1971 |
| [73] | Assignee | Leefac, Inc. |
| | | Boley, Okla. |

[54] COOKING APPARATUS
10 Claims, 8 Drawing Figs.

[52] U.S. Cl.............................................. 99/259,
99/421, 99/446, 126/59.5
[51] Int. Cl.............................................. A23b 1/04
[50] Field of Search............................... 99/259,
446, 262, 443, 421; 17/44; 126/378, 59.5;
211/113, 115, 116, 117; 220/17, 55

[56] References Cited
UNITED STATES PATENTS

| 457,471 | 8/1891 | Bregha | (220/55(P.C.))UX |
| 1,966,681 | 7/1934 | Petersen et al. | (220/55(P.C.))UX |
| 2,277,824 | 3/1942 | Franson | (220/55(P.C.))UX |
| 2,517,360 | 8/1950 | Singer | 99/421X |
| 2,582,801 | 1/1952 | Steen | 220/17X |
| 2,906,191 | 9/1959 | Lee | 99/259 |
| 3,053,169 | 9/1962 | Rappaport | 99/421(V) |

FOREIGN PATENTS

| 268,484 | 8/1950 | Switzerland | 220/55 |

Primary Examiner—Walter A. Scheel
Assistant Examiner—Arthur O. Henderson
Attorney—Berman, Davidson and Berman ABSTRACT: A pressure cooker, with means to add aromatic flavor to items cooked therein. The cooker consists of a pressure vessel having food-supporting rack or tray means therein. A cup for charring material is provided in the vessel, with an electrical heating element therefor. A main electrical heating element is also provided. Both heating elements have common adjustable thermostatic control means. Also, a timer is provided. The vessel has a drain valve with a manually operated handle plate. When the handle plate is swung to valve-opening position, it obstructs access to the main controls of the cooker, preventing it from being accidentally turned on while being drained.

INVENTOR.
MAURICE W. LEE, SR.

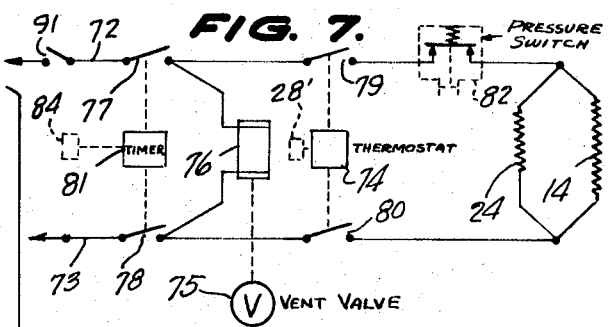
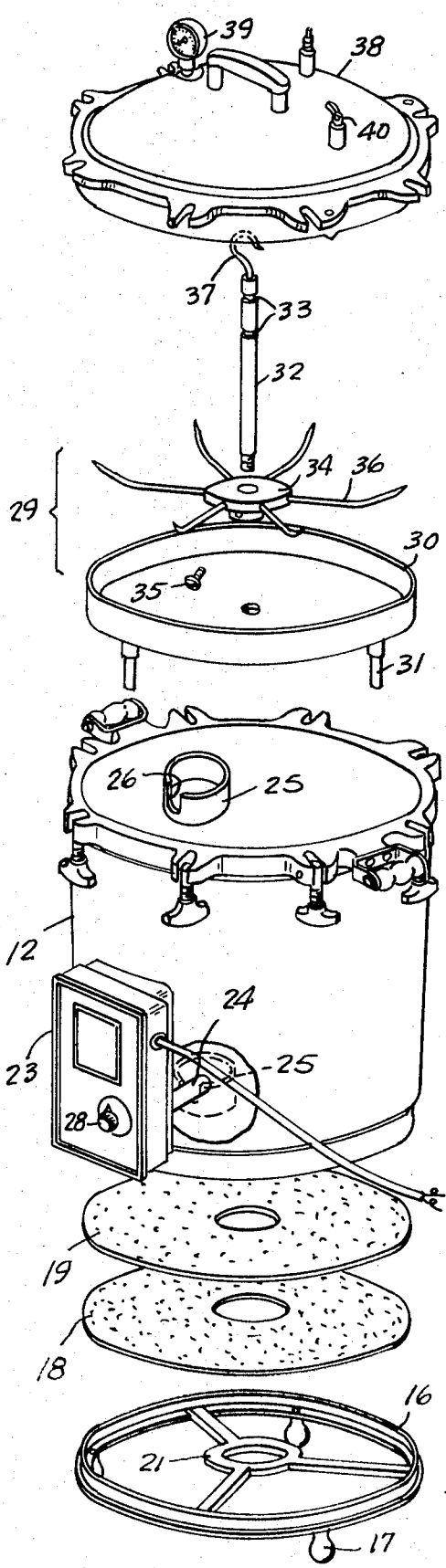
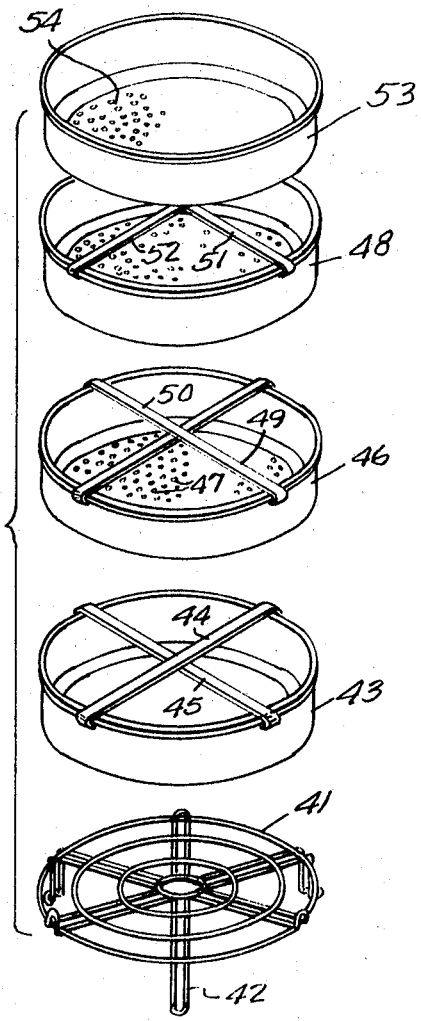
INVENTOR.
MAURICE W. LEE, SR.
BY
Berman, Davidson & Berman,
ATTORNEYS.

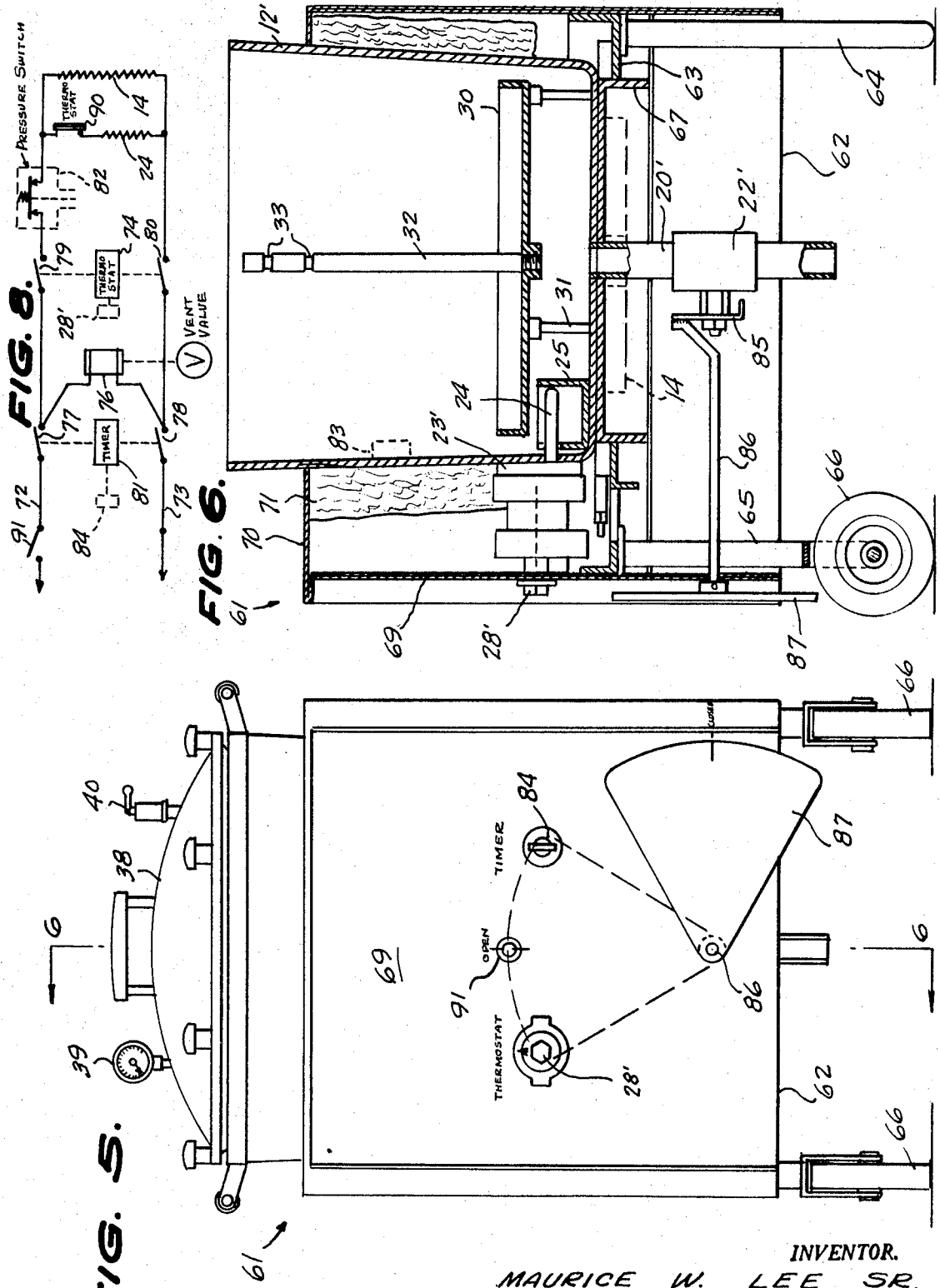

COOKING APPARATUS

This invention relates to pressure cooking vessels, and more particularly to an electrically heated pressure cooker containing means to impart an aromatic flavor to food items cooked therein.

A main object of the invention is to provide a novel and improved electrically operated pressure cooker which is relatively simple in construction, which is easy to operate, and which is designed to impart an aromatic flavor to food items cooked therein.

A further object of the invention is to provide an improved electrically operated pressure cooker of the type having means for vaporizing a quantity of water and for vaporizing a food-flavoring substance, whereby to impart an aromatic flavor to food items cooked in the device, the pressure cooker being inexpensive to manufacture, being safe to use, and being substantially automatic in operation.

A still further object of the invention is to provide an improved electrically operated, thermostatically controlled and electrically timed pressure cooker of the type provided with means to impart an aromatic flavor to food items cooked therein, the pressure cooker being relatively compact in size, being easy to drain, when required, and being so arranged that it cannot be accidentally turned on while being drained.

Further objects and advantages of the invention will become apparent from the following description and claims, and from the accompanying drawings, wherein:

FIG. 3 is a perspective view of the pressure cooker of FIGS. 1 and 2 with the parts thereof shown in separated positions.

FIG. 4 is a perspective view showing a plurality of food-supporting devices which may be employed in conjunction with a pressure cooker such as that illustrated in FIGS. 1, 2 and 3.

FIG. 5 is a front elevational view of a modified form of electrically operated pressure cooker constructed in accordance with the present invention.

FIG. 6 is a vertical transverse cross-sectional view taken substantially on the line 6-6 of FIG. 5.

FIG. 7 is a wiring diagram showing the electrical connections of the typical pressure cooker of FIGS. 5 and 6.

FIG. 8 is a wiring diagram of a modified pressure cooker according to the present invention.

Figure 1:
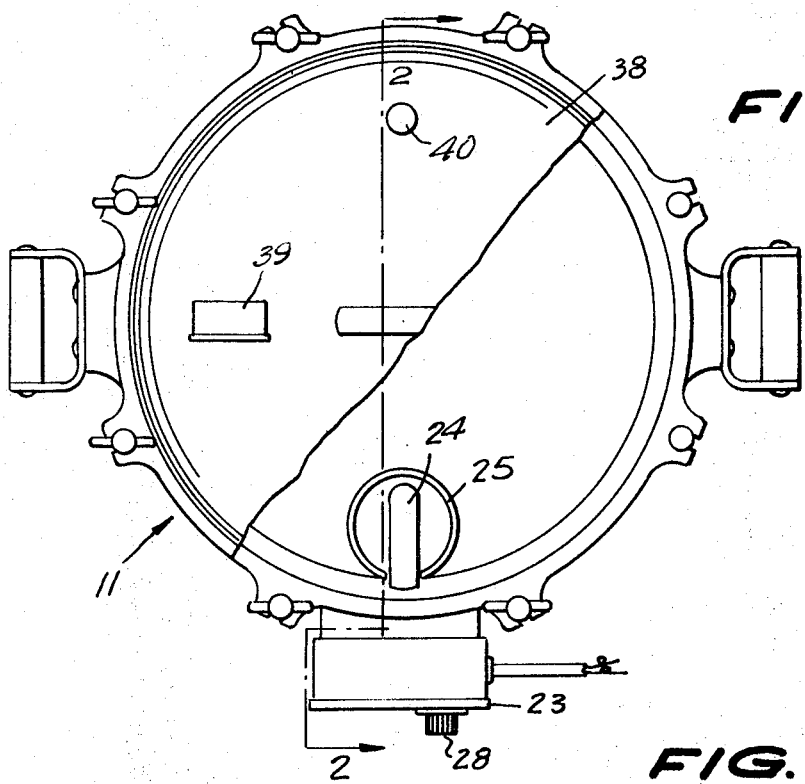
FIG. 1 is a top plan view, partly broken away, of a typical electrically operated pressure cooker according to the present invention.
Figure 2:
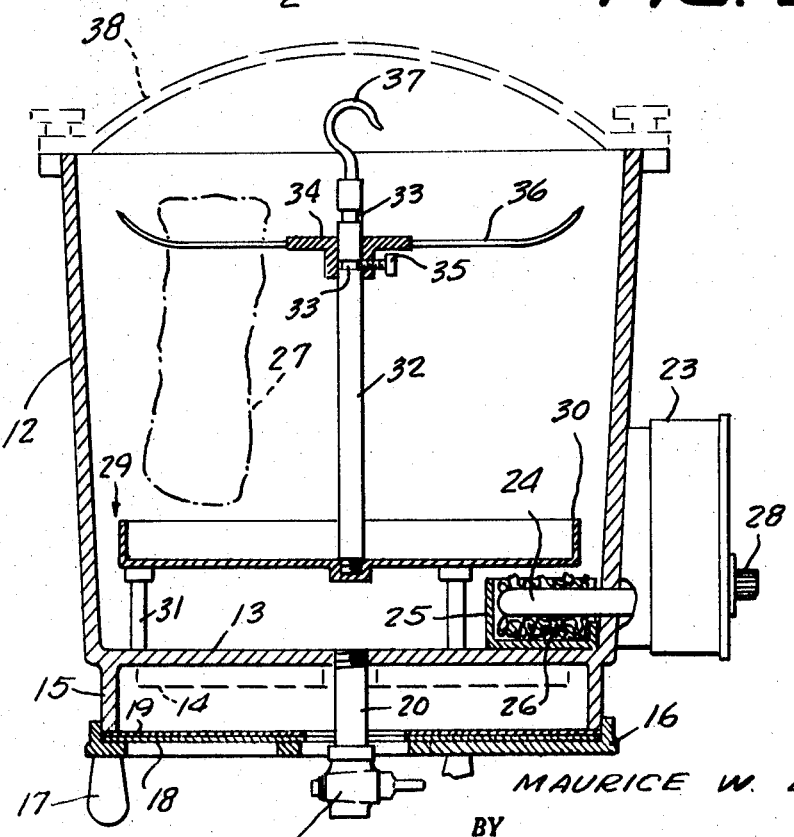
FIG. 2 is a vertical transverse cross-sectional view taken substantially on the line 2-2 of FIG. 1.

Referring to the drawings, and more particularly to FIGS. 1 to 4, 11 generally designates a typical embodiment of an electrically operated pressure cooker constructed generally in accordance with the present invention. The pressure cooker 11 comprises a main container 12 having a bottom wall 13, said bottom wall being provided at its underside with the main electrical heating element, shown in dotted view at 14. The container 12 is provided with the depending annular peripheral flange 15 which is supportingly received in a generally circular trivet 16 having the depending supporting legs 17. A pair of centrally apertured circular asbestos pads 18 and 19 are provided in the circular seat of the trivet 16, receiving the bottom rim of the depending flange 15 thereon, as shown in FIG. 2. Centrally connected to the bottom wall 13 is a drain pipe 20 which depends through the central ring 21 of trivet 16 and which is provided at its bottom end with a manually operable drain valve 22.

Designated at 23 is an auxiliary thermostatically controlled heater assembly which is secured to the sidewall of the container 12 and which is provided with the inwardly projecting heating element 24 which is received in a cup 25 suitably supported on the bottom wall 13, the cup having a notch 26 through which the horizontal heating element 24 extends, as shown in FIG. 2. Cup 25 is adapted to be filled with hickory shavings or other aromatic woods, or liquids, intended to provide an aromatic flavor to food material processed in the cooker. For example, the cup 25 may contain a quantity of hickory shavings 26, as shown in FIG. 2. When the device is in operation, the heating element 24 chars the shavings 26 and generates an aromatic smoke or vapor which permeates the food material, for example, a slab of meat 27 contained in the device, and imparts to it a smoked aromatic flavor.

The heating circuit, including elements 24 and 14, is provided with an adjustable thermostat having the exposed control knob 28 which may be manually set to control the temperature of the heating elements 14 and 24 and to thereby control the degree of charring of the material 26, namely, the degree of generation of the aromatic smoke in the container during its operation.

As shown in the modified circuit of FIG. 8, the auxiliary heating element 24 may be provided with its own thermostat 74 which may be set to control the temperature of the charring heating element 24 and thereby control the degree of charring of the material independently of the main heating element.

In the typical arrangement illustrated in FIGS. 2 and 3, the container is provided with an internal rack assembly, designated generally at 29, comprising a circular drip tray 30 provided with depending supporting legs 31 which rest on bottom wall 13 and support the tray 30. Threadedly secured centrally in the tray 30 is an upstanding post element 32 formed near its top end with a plurality of annular grooves 33. Adjustably secured on the post member 32 is a collar element 34 provided with a locking screw 35 which may be engaged in a selected annular groove 33. Projecting radially from the collar element 34 are a plurality of stainless steel skewer rods 36 on which food items to be cooked may be impaled for suspension over the drip tray 30. For example, a number of slabs of meat 27 may be impaled on the skewers 36 in the manner illustrated in dotted view in FIG. 2.

The top end of the post member 32 is provided with a hook 37 to facilitate the lifting of the rack device 29 out of the container, or the insertion thereof in the container.

The pressure cooker assembly 11 is provided with a conventional sealable top cover 38 which may be clampingly locked on the top rim of the container 12 in a conventional manner, the top cover being provided with the usual pressure gauge 39 and relief plug 40.

In using the apparatus of FIGS. 1, 2 and 3, hickory shavings, or other aromatic combustible material is placed in the charring cup 25. A small quantity of water or aromatic flavoring liquid is placed in the bottom of the container 12. The slabs of meat 27, or other food items to be cooked are suitably prepared and are impaled on the skewers 36, and the rack 29 is inserted in the container 12. The top cover 38 is clamped on the top rim of the container 12 and the electrical heating elements of the device are energized and are manually timed. The water in the bottom of the container 12 boils and creates steam pressure. The hickory wood shavings, or other combustible material 26 chars and generates smoke. Since the interior of the container is under considerable pressure, the smoke is forced into the meat 27, or other food material being cooked, and at the same time, the meat, or other food material, is cooked and browned. The grease, or drippings, from the food material is caught in the drip tray 30.

At the end of the timed cooking period, the heating elements become deenergized. The container 12 may be drained by opening the drain valve 22, allowing the remaining liquid to drain into a suitable receptacle. Drainage, of course, is performed only after the container has cooled down and the interior pressure thereof has been reduced to a safe value.

As will be readily understood, at the completion of the cooking operation, and after the container 12 has cooled down to a safe value, the cover 38 may be removed and the rack device 29 with its contents of cooked material may be lifted out of the container.

A wide variety of different types of food-supporting racks, pans, or trays, may be employed in the container 12 in place of the rack assembly 29. Thus, as shown in FIG. 4, a wire bottom rack 41 may be used in place of the device 29, the bottom rack 41 being formed with suitable depending supporting legs 42 corresponding to the depending legs 31 of tray 30. A circular pan 43 adapted to contain food material to be cooked may be supported on the rack 41. The pan 43 is provided with the top crossbars, 44, 45 secured to the top rim of the pan in perpendicular relationship, as shown in FIG. 4, to provide support for additional trays and also to facilitate handling the pan 43. Additional trays, such as the circular pan 46 may be employed on top of the tray 43. In this case, the pan 46 has an apertured bottom wall 47 through which drippings may fall into the bottom pan 43. A further pan 48, similar to the pan 46, may be employed on top of the tray 46, the pan 48 likewise having an apertured bottom wall, as shown in FIG. 4. The pans 46 and 48 may be provided with the perpendicularly arranged top crossbars, shown respectively at 49, 50 and 51, 52, these crossbars serving the same purpose as the crossbars 44, 45, with respect to said pans 46 and 48.

A further circular pan 53 having an apertured bottom wall 54 may be employed on top of the pan 48. As will be readily understood, each of the pans 43, 46, 48 and 53 may contain articles of food to be pressure-smoked. As will be further understood, any desired number of food-supporting pans may be employed in the container 12, being vertically stacked therein in the manner generally illustrated in FIG. 4.

As in the case of the arrangement of FIGS. 1, 2 and 3, the food articles supported in the pans 46, 48, 53 and 43, if each of such pans is so used, will be pressure-cooked and will be permeated with the aromatic smoky flavor resulting from the generation of aromatic smoke from the material 26 in the manner described above in connection with the operation of the device employing the skewer rack 29, as illustrated in FIGS. 2 and 3.

Referring now to FIGS. 5 6, 61 generally designates a modified form of electrically operated pressure cooker according to the present invention. The pressure cooker assembly 61 comprises a wheeled cart, designated generally at 62, the cart being provided with a frame 63 which is generally rectangular in plan and which is provided at its forward corners with depending supporting legs 64 and at its rear corners with depending vertical legs 65 provided with swiveled supporting casters 66. The frame 53 includes a circular kettle-supporting housing portion 67 containing the main electrical heating element 14, as shown in dotted view in FIG. 6. The main container of the pressure cooker is shown at 12' and is mounted on the supporting housing 67. The container 12' may be provided with any suitable food-supporting assembly, for example, a skewer rack assembly 29 similar to that illustrated in FIG. 2.

The main container 12' is provided with a conventional pressure cooker cover 38, as in the previously described form of the invention.

A cup 25 for material to be charred is likewise provided, as in the previously described form of the invention, and associated therewith is an auxiliary heating unit assembly 23' having the inwardly projecting heating element 24 received in the cup 25, as shown in FIG. 6. The assembly 23' includes an adjustable thermostat having an externally exposed adjusting knob 28', said adjusting knob being exposed at the vertical transverse wall 69 forming part of the main housing 62.

The main housing 62 is likewise provided with a top wall 70, and the space between the walls of the housing 62 and the container 12' is preferably filled with suitable heat-insulating material 71.

The electrical circuit of the pressure cooker device 61 is conventional and comprises the main heating element 14, the auxiliary heating element 24 and various control devices associated therewith. Thus, as shown in FIG. 7, the device is energized from a pair of power supply wires 72 and 73. The terminals of the heating elements 14 and 24 are connected in parallel, and are connected to the line wires 72 and 73 through the contacts 77, 78 of the timer 81, the contacts 79, 80 of the thermostat switch unit 74, and the contacts of a pressure-responsive switch 82 having a sensing element 83 which is exposed to the interior of the main container 12', the sensing element responding to a predetermined value of pressure in the main container to open its contacts and thereby deenergize the heating elements 24 and 14. The device is placed in operation by closing the timer contacts 77, 78. The thermostat contacts 79, 80 and the pressure switch contacts are normally closed.

After a predetermined time period, determined by the setting of timer 81, the timer-controlled switch contacts 77, 78 open. The timer 81 is provided with an adjusting knob 84 which is located in horizontal alignment with the thermostat-control knob 28', as shown in FIG. 5, namely, is exposed externally of the transverse housing wall 69. As shown in FIG. 5, the knobs 28' and 84 are at the same height and are arranged substantially symmetrically with respect to the vertical central line of the panel 69, in the typical embodiment illustrated in FIG. 5.

The main container is provided with a normally open electrically controlled vent valve 75 having an operating solenoid 76 connected to the supply wires 72, 73 through the timer contacts 77, 78. Thus, vent valve 75 closes when the device is energized by the closure of timer contacts 77, 78. Said vent valve opens to allow exhaust of the container to atmosphere responsive to the opening of the timer contacts.

Although the typical wiring diagram shown in FIG. 7 illustrates both the main heating element 14 and the auxiliary heating element 24 as both being thermostatically controlled in accordance with the setting of the knob 28', any other suitable arrangement may be employed. For example, as shown in FIG. 8, the auxiliary heating element 24 may be provided with its own, independently settable thermostat 90.

As above-mentioned, the electrical circuit arrangement is conventional, and various suitable electrical circuit arrangements will suggest themselves to those skilled in the art. However, in accordance with the present invention, there will be an adjustment knob or corresponding control element for adjusting the allowable temperature rise of the auxiliary heating element 24, so that the degree of charring of the material in cup 25 can be adjusted by operating the control knob 28'. Also, the amount of cooking time can be adjusted by means of the control knob 84.

As in the previously described form of the invention, the main container 12' is provided centrally of its bottom wall with a depending drain pipe 20' provided with a normally closed drain valve 22'. The drain valve 22' is provided with a control arm 85 to which is rigidly secured an operating shaft 86 which is in axial alignment with the valve rotor, as shown in FIG. 6, and which extends rotatably through the panel 69 midway between and below the control knob 28' and knob 84, as shown in FIG. 5.

In the typical arrangement of FIGS. 5 and 6, the drain valve control rod 86 is located on the lower portion of the central line defined between the symmetrically arranged knobs 28' and 84. A main control switch 91 may be employed, located on said central line at the same radial distance from the rod 86 as the knobs 28' and 84, as shown in FIG. 5.

Rigidly to the exposed end of the control rod 86 is a sector plate 87 which is concentric with the rod 86 and which has a radius substantially greater than the distance from rod 86 to the knobs 84 and 28' and to the control switch 91. The sector plate 87 is in the full-line position thereof shown in FIG. 5 when the drain valve 22' is closed. This represents the normal operating position of the pressure cooker device. When the sector plate 87 is rotated from the full-line position thereof shown in FIG. 5 to the dotted-view position thereof, the drain valve 22' is opened, allowing the liquid in the bottom of the main container 12' to be drained out in the manner described above in connection with the form of the invention illustrated in FIGS. 1, 2 and 3. It will be seen form FIG. 5 that with the valve 22' in its open position, the sector plate 87 overlies the control elements 28', 91 and 84, preventing access thereto.

Thus, it is not possible to energize or adjust the cooker device when the sector plate 87 is in its dotted-view position, shown in FIG. 5, namely, while the container 12' is being drained. This represents a very important safety feature.

Thus, where it is desired to operate the pressure cooker device 61', it is necessary to close the drain valve 22', namely, to move the sector plate 87 to its full-line position shown in FIG. 5. In this position it is possible to operate the main control switch 91 and to adjust the timer mechanism 81 and the thermostat device associated with the auxiliary heating element 24, since the knobs 84 and 28' will then be accessible.

As will be readily apparent, the sector plate 87 may be made in any desired shape, provided that it is large enough to cover the control elements 28', 91 and 84 when it is rotated to the position wherein it opens the drain valve 22'.

While certain specific embodiments of an improved electrically operated pressure cooker have been disclosed in the foregoing description it will be understood that various modifications within the spirit of the invention may occur to those skilled in the art. Therefore, it is intended that no limitations be placed on the invention except as defined by the scope of the appended claims.

What I claim is:

1. A pressure cooker comprising a main container provided with a removable lockable sealing cover, means to heat the interior of the main container, means to support food articles in said main container, a depending drain conduit communicatively connected to the bottom wall of said main container, a manually operated drain valve in said drain conduit, a cup member adapted to receive combustible food-flavoring material mounted in said container below said support means adjacent said bottom wall of the container and adjacent the peripheral wall portion thereof, an auxiliary heating assembly mounted on said peripheral wall portion and including an inwardly projecting heating element extending into said cup member and arranged to char combustible flavoring material in the cup member and to cause the flavoring material to diffuse upwardly around said support means, and an externally exposed manually adjustable control element operatively connected to said auxiliary heating assembly.

2. A pressure cooker comprising a main container provided with a removable lockable sealing cover, means to heat the interior of the main container, means to support food articles in said main container, a depending drain conduit communicatively connected to the bottom wall of said main container, a manually operated drain valve in said drain conduit, a cup member adapted to receive combustible food-flavoring material mounted in said container adjacent a peripheral wall portion thereof, an auxiliary heating assembly mounted on said peripheral wall portion and including an inwardly projecting heating element extending into said cup member and arranged to char combustible flavoring material in the cup member, and an externally exposed manually adjustable control element operatively connected to said auxiliary heating assembly, wherein said drain valve has a manually operated rotatable control member which can be actuated to open and close said drain valve, said control member being mounted so as to substantially cover and prevent access to said control element of the auxiliary heating assembly when the drain valve is open, but to expose said control element when the drain valve is closed.

3. The pressure cooker of claim 2, and wherein said cup member has a peripheral wall formed with a notch, said heating element extending substantially horizontally through said notch.

4. The pressure cooker of claim 3, and wherein said pressure cooker is provided with an energizing circuit including an adjustable timer, said timer having a manually operated control element located adjacent said manually adjustable auxiliary heating assembly control element so as to be also substantially covered by said drain valve control member when said drain valve is open.

5. The pressure cooker of claim 4, and wherein said energizing circuit includes a main control switch mounted so as to be also substantially covered by said drain valve control member when the drain valve is open.

6. The pressure cooker of claim 5, and wherein said energizing circuit includes pressure-responsive normally closed switch means exposed to the interior of the main container, and circuit means to deenergize said heating element responsive to opening of said switch means.

7. The pressure cooker of claim 6, and wherein said drain valve is provided with a horizontally extending rotatable control shaft, said control member being rigidly secured to said control shaft.

8. The pressure cooker of claim 7, and wherein said control member comprises a sector-shaped rigid plate.

9. The pressure cooker of claim 8, and wherein said sector-shaped plate has its apex portion rigidly secured to said control shaft and wherein the radius of said plate is at least as great as the distance from said control shaft to the furthermost of the manually adjustable control elements of he the auxiliary heating assembly and timer and the main control switch.

10. The pressure cooker of claim 9, and wherein the manually adjustable control elements and the main control switch are mounted at substantially equal distances from said control shaft.